Fig. 1 (Record)

INVENTOR.
Wayne R. Johnson
By Keith D. Beecher
Attorney

INVENTOR.
Wayne R. Johnson
By Keith D. Beecher
Attorney

United States Patent Office 3,112,052

Patented Nov. 26, 1963

3,112,052

MAGNETIC TAPE CONTROL SYSTEM

Wayne R. Johnson, Los Angeles, Calif., assignor to Winston Research Corporation, Beverly Hills, Calif., a corporation of California Filed July 16, 1962, Ser. No. 210,153
13 Claims. (Cl. 226—42)

Figure 1:
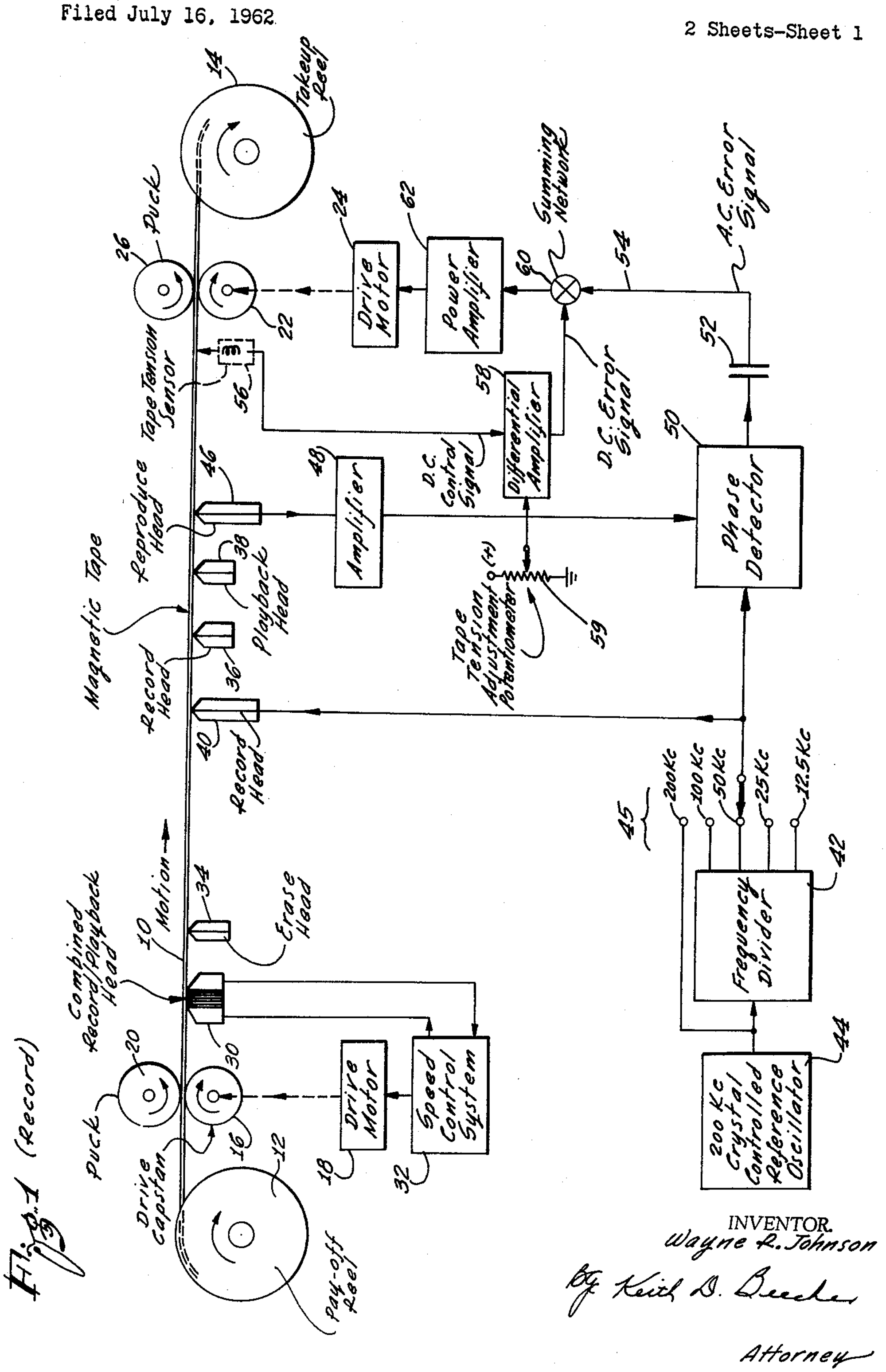

The present invention relates to an improved system for controlling the drive of a record member, such as a magnetic tape; and the invention relates more particularly to an improved control system for compensating for time displacement errors due to changes in length of the tape, as it is drawn through the magnetic recording/reproducing mechanism.

It is well known that any variation in the speed of the magnetic tape as it is drawn past the reproducing head in a reproducing mechanism produces a spurious frequency modulation, or "flutter," in the reproduced signals. Many attempts have been made in the prior art to eliminate "flutter." These prior art attempts have resulted in a variety of control systems for controlling the magnetic tape, so that it may be driven at a constant speed past the recording and reproducing heads of the recording/reproducing mechanism.

One such prior art speed control system involves recording a constant frequency pilot signal on a particular track on the tape. The pilot signal is reproduced at the reproducing mechanism and is compared with a reference signal. Any changes in the frequency of the pilot signal with respect to the reference signal indicate a variation in the speed of the tape. An error signal indicative of such changes is used in the prior art mechanism so that the speed of the tape may be held constant.

The prior art systems, such as described above, have been generally satisfactory, especially in applications where a single reproduce head is used in the reproducing mechanism to recover the recorded information. However, in many applications in which a plurality of reproduce heads are used in the reproducing mechanism, coupled, for example to different channels on the record medium, spurious changes in the frequency of the reproduced signals have been found to occur. These changes are caused, for the most part, by time displacement errors due to elongations and contractions of the record medium.

The elongations and contractions of the record medium can occur in the recording mechanism, for example, and the resulting time displacement errors cause spurious variations in the recorded pilot signal which is intended to have a constant frequency. These variations in the length of the record medium can also occur at the reproducing medium, at which they produce the spurious variations in the reproduced signals, even though the frequency of the pilot signal as reproduced by another head remains constant.

The improved control system of the present invention responds to time displacement errors due to changes in the length of the record medium in the recording mechanism and/or the reproducing mechanism to produce control signals for compensating for such errors.

It is, accordingly, an object of the invention to provide an improved control system for use in a recording/reproducing mechanism and which is particularly useful in compensating for time displacement errors due to changes in length of the record medium as it is driven past the recording or reproducing heads.

Another object is to provide such an improved control system which is extremely accurate and precise in its operation, and yet which involves a minimum of components and relatively simple associated circuitry.

The control system of the invention, in the embodiments to be described, provides for a first capstan drive means for a record member, such as a magnetic tape, for driving the record member past the transducer heads in the recording or reproducing mechanism, and it also provides for a second capstan drive means positioned on the other side of the heads for maintaining a particular tension on the record member. The control system of the invention is such that, any tendency for an elongation or contraction of the record member to produce a time displacement error at any of the transducer heads, causes a dynamic alternating current error signal to be produced. This dynamic alternating current error signal is used to control the second capstan drive means, for example, so that the dynamic tension on the record member is continuously changed to compensate for such elongations or contractions of the record member.

The control system of the invention provides, therefore, for a tension control for the record member which maintains a particular static tension on the member as it is driven past the transducer heads; and which simultaneously provides for a continuously changing dynamic tension in accordance with any elongations or contractions of the record member to compensate for the time displacement errors due to such elongations or contractions.

Figure 2:
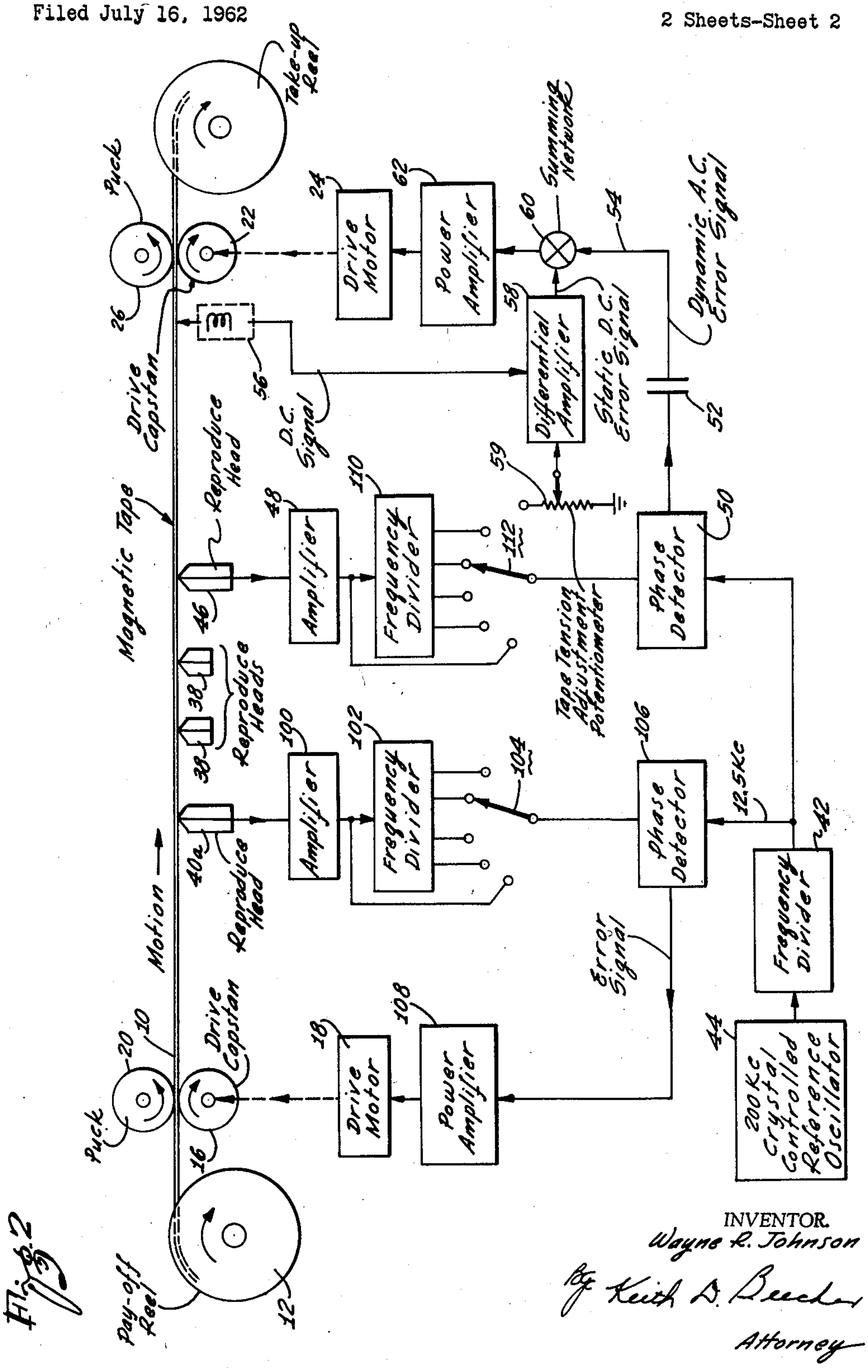

The features of the invention which are believed to be new are set forth in the claims. The invention itself, however, may best be understood by reference to the following description, when taken in conjunction with the accompanying drawings, in which:

FIGURE 1 is a schematic block diagram of a magnetic tape recording mechanism and system including the control system of the present invention; and FIGURE 2 is a schematic block diagram of a magnetic tape reproducing mechanism and system including the control system of the invention.

Although the mechanisms and systems of FIGURES 1 and 2 are set out as two separate entities, it will be appreciated that both may be incorporated in a single record/reproduce mechanism and system by the use of appropriate switching circuits, and also by the dual use of record/reproduce heads.

The mechanism and system of FIGURE 1 includes a record member, such as a magnetic tape 10, which is driven through the mechanism from a pay-off reel 12 to a take-up reel 14. The reels 12 and 14 may have the usual drive motors and electromagnetic brakes associated with them, as is well understood in the art.

The magnetic tape 10 is driven from the reel 12 to the reel 14 by a main drive capstan 16. The drive capstan 16 is, in turn, driven by a drive motor 18 which may be of the direct current, low inertia permanent magnet type. A puck, or squeeze roller, 20 is positioned on the opposite side of the tape 10 from the drive capstan 16. The puck 20 is actuable, by a usual known control mechanism, between a displaced position at which no motion is imparted to the tape by the drive capstan 20, and an operative position in which the tape 10 is squeezed between the puck 20 and the capstan drive 16, so that motion may be imparted to the tape.

A second, auxiliary drive capstan 22 is also provided, and the drive capstan 22 is driven by a drive motor 24, and it cooperates with a puck 26. The drive motor 24, like the drive motor 18, may be a low inertia, direct current, permanent magnet type. The puck 26 is controllable in the same manner as the puck 20. The drive capstan 22, in conjunction with the puck 26 serves, in a manner to be described, to maintain a particular static tension on the tape 10, and a varying dynamic tension, as the tape is drawn through the recording mechanism.

A speed control for the drive motor 18 is provided by means of a combined record/playback head 30 which is magnetically coupled to the tape 10, and which is connected to a speed control system 32. The speed control system 32, and the associated combined record/playback head 30 may be constructed and may operate in the manner described in the copending application Serial No. 209,690 filed July 13, 1962 in the name of the present inventor. The speed control system 32 is couped to the drive motor 18.

As described in detail in the copending application, the combined record/playback head 30 records a pulse on the tape 10 and subsequently reads the pulse, so as to set up a circulation of pulses through the speed control system. Any changes in the repetition frequency of the circulating pulses represents a change in tape speed, and such a change sets up a control for the drive motor 18 in a direction to compensate therefor. In this manner the control system serves to maintain a constant tape speed past the head 30.

An erase head 34 may be provided to erase the pulses recorded on the tape by the record section of the combined record/playback head 30.

A usual record head 36, or a plurality of such record heads, may be provided for recording information on different tracks on the tape 10. Likewise, a playback head 38, or plurality of such heads, may be provided for reproducing the information recorded on the tape by the record head, or heads, 36.

The control system of the present invention includes a record head 40. This record head is connected to a frequency divider 42 which, in turn, is coupled to a reference oscillator 44. As illustrated in FIGURE 1, the reference oscillator may be a 200 kilocycle, crystal controlled oscillator.

The record head 40 serves to record a pilot signal on a particular track on the tape 10. This pilot signal may be selected to have a particular frequency, and the frequency selection may be made by means of a selector switch 45.

The control system of the invention also includes a reproduce head 46 which is coupled to the tape 10, and which is spaced from the record head 40. It will be observed that the transducer heads 36, 38, 40 and 46 referred to above are positioned between the main drive capstan 16 and the auxiliary drive capstan 22. Also, the record head 36 and playback head 38 are interposed between the record head 40 and the reproduce head 46.

The reproduce head 46 is magnetically coupled to the pilot frequency track on the tape 10, and it produces an electrical signal in response to the sensing of the recorded pilot signal thereby. The electrical signal from the reproduce head 46 is amplified in an amplifier 48, and the amplified signal is introduced to a phase detector 50. The selected signal from the frequency divider 42 is also applied to the phase detector 50. The output from the phase detector 50 is passed through a capacitor 52, so that an alternating current error signal appears on the lead 54. This alternating current error signal reflects dynamic changes in the frequency of the signal from the reproduce head 46, as compared with the reference signal from the frequency divider 42.

The recording mechanism and system of FIGURE 1 also includes a usual tape static tension sensor 56 which is positioned between the reproduce head 46 and the auxiliary drive capstan 22. The tape tension sensor serves to sense the static tension on the tape 10, and it produces a direct current control signal representative of such static tension. This control signal is applied to a differential amplifier 58.

The movable arm of a potentiometer 59 is also connected to the differential amplifier 58. The potentiometer 60 is connected between the positive terminal of a unidirectional potential source and ground, and it serves as an adjustment for the static tension on the tape 10. The differential amplifier 58 produces a direct current error signal which is representative of any differences between the direct current control signal from the sensor 56 and the potential setting of the potentiometer 59.

The direct current error signal from the differential amplifier 58, and the alternating current error signal on the lead 54 are applied through a summing network 60 to a power amplifier 62. The power amplifier 62 is used to supply energizing current to the drive motor 24.

The various components of the system of FIGURE 1 illustrated in block form are, in themselves, well known to the electrical and electronic art. For that reason, it is believed that a detailed circuit description of these various components is unnecessary to the description of the present invention, and would only encumber the record.

The recording system of FIGURE 1 serves to record the reference signal from the frequency divider 42 on a track of the tape 10 so as to constitute a pilot signal for the tape. This recording is carried out by the record head 40, and it results in a constant frequency pilot signal being recorded on the tape. To assure that the tape 10 will be drawn past the head 30 at a constant speed, the speed control system 32 in conjunction with the combined record/playback head 30 controls the speed of the main drive capstan 16. This control is carried out in a manner described in detail in the above-mentioned copending application.

To further assure constancy in the recording process, the tape tension sensor 56 assures that the drive motor 24 will cause the drive capstan 22 to maintain a constant static tension on the tape. This static tension can be manually adjusted, by adjustment of the potentiometer 60.

Further to assure constancy in the recording process, and to compensate for time displacements due to dynamic changes in the tape length, the alternating current error signal produced on the lead 54 causes the power amplifier 62 to control the drive motor 24 in a manner such that the dynamic tension on the tape is continuously changed in response to such time displacement tendencies, so as to maintain a uniform tape speed past the heads 36, 38 and 46; even in the presence of such tendencies.

As mentioned above, the reproducing mechanism and system of FIGURE 2 and the recording mechanism of FIGURE 1 may be constructed as a single unit. For that reason, similar components in the mechanism and system of FIGURE 2 are designated by the numbers used in the system and mechanism of FIGURE 1.

In the system and mechanism of FIGURE 2, the record head 40 is used as a reproduce head 40*a*, and a plurality of reproduce heads 38 are shown as interposed between the reproduce head 40*a* and the reproduce head 46.

The tape 10 is drawn past the reproduce heads 38, so that they may reproduce the information previously recorded on the tape. The reproduce head 40*a* is coupled to the pilot signal channel, and it responds to the previously recorded pilot signal to produce a corresponding electrical signal.

The signal produced by the head 40*a* is amplified in an amplifier 100, and the amplified signal is applied to a frequency divider 102. The frequency divider has a plurality of output taps, and a selector switch 104 selects a particular tap corresponding to the signal frequency to be derived from the frequency divider 102. This signal frequency is of a selected value, such as 12.5 kilocycles, for example, and the selector switch 104 permits such a frequency to be derived, for any particular selected speed of the tape 10. The signal frequency selected from the frequency divider 42 is introduced to a phase detector 106, as well as to the phase detector 50.

The phase detector 106 compares the signal derived from the frequency divider 102 with the standard reference frequency from the frequency divider 42. As a result of this comparison, a direct current error signal is applied to a power amplifier 108. The power amplifier 108 is coupled to the drive motor 18 of the main drive capstan 16. This drive motor, as mentioned above, may be of the low inertia, direct current, permanent magnet type.

The power amplifier 108 serves to control the speed of the drive motor 18. The power amplifier is under the control of the error signal from the phase detector 106, as mentioned above. To prevent runaway of the system and to assure that the speed of the tape will be brought into the range of the phase detector 106, a speed control system such as described in above-mentioned copending application Serial No. 209,690 may be incorporated into the circuit; this latter speed control system being automatically deactivated when the phase detector 106 takes over.

The control of the drive motor 18 is such that any flutter or time displacements sensed by the reproduce head **40*a*** are reduced in magnitude. However, the compensating control produced by the reproduce head 40*a* and its associated circuitry has no effect in controlling further flutter and other frequency distortions which may occur in the signals reproduced by the heads 38 due to elongations and contractions of the tape. These latter distortions are compensated by the improved control system of the invention.

As before, the reproduce head 46 senses the pilot signal recorded on the tape 10, and the resulting electrical signal is amplified by the amplifier 48. The amplifier 48 is coupled to a frequency divider 110 which has a plurality of output taps. A selector switch 112 selects a particular signal frequency from the frequency divider 110, such as 12.5 kilocycles. The use of the selector switch 112 permits a particular signal frequency to be selected, regardless of the speed at which the tape 10 may be set.

The frequency divider 110 is connected to the phase detector 50, so that the signal from the frequency divider 110 may be compared with the signal derived from the frequency divider 42. As before, an alternating current error signal is produced on the lead 54. This alternating current signal represents dynamic changes in the length of the tape 10 as it is driven across the head 46, and which changes, unless compensated, produce spurious flutter in the signals reproduced by the heads 38.

As in the previous embodiment, the tape tension sensor 56 produces a direct current control signal which is proportional to the static tape tension, and this signal is compared in the differential amplifier 58 with the potential derived from the tension adjustment potentiometer 60.

The resulting static direct current error signal from the differential amplifier 58 and the dynamic alternating current error signal on the lead 54 are applied to the power amplifier 62. As before, the power amplifier 62 controls the drive motor 24. This control is such that the static tension on the tape 10 is maintained at a value established by the setting of the potentiometer 60; and at the same time, the dynamic tension on the tape is continuously changed to compensate for any tendencies for time displacements to occur due to changes in tape length as the tape is driven across the reproduce head 38.

The invention provides, therefore, and improved control system for use in a magnetic recording/reproducing mechanism and system. The improved control system of the invention is advantageous in that it responds to dynamic changes in the length of the tape as it is driven across the transducer heads to provide for compensating changes in the dynamic tension on the tape. The present invention is most advantageous in that it permits for a precise control of the record medium, even though the medium is driven past a plurality of reproduce head and even though the medium is subject to elongations as it is so driven.

While particular embodiments of the invention have been shown and described, modifications may be made, and it is intended in the following claims to cover all the modification which fall within the scope of the invention.

What is claimed is.

1. A control system for a movable record member having a pilot signal recorded thereon of a predetermined frequency, said control system including: transducer means responsive to the recorded pilot signal on said record member for producing an electrical control signal of a particular frequency; first drive means for said record member positioned on one side of said transducer means for driving the record member past said transducer means; second drive means for said record member positioned on the other side of said transducer means for maintaining a particular tension on said record member as it is driven past said transducer means; detector means coupled to said transducer means and responsive to the electrical signal therefrom for producing an error signal corresponding to changes in the frequency of said electrical signal from said particular frequency; and circuit means coupling said detector means to at least one of said drive means for introducing said error signal thereto to cause said drive means to change the dynamic tension on said record member in a direction to compensate for such frequency changes in said electrical signal.

2. A control system for a movable record member having a pilot signal recorded thereon of a predetermined frequency, said control system including: transducer means responsive to the recorded pilot signal on said record member for producing a first electrical control signal of a particular frequency; first capstan drive means for said record member positioned on one side of said transducer means for driving the record member past said transducer means and including an associated drive motor; second capstan drive means for said record member positioned on the other side of said transducer means for maintaining a particular static tension on said record member as it is driven past said transducer means and including an associated drive motor; tension sensing means positioned to be coupled to said record member for producing a second electrical control signal indicative of the static tension on said record member; first detector means coupled to said transducer means and responsive to the electrical signal therefrom for producing an alternating current error signal corresponding to changes in the frequency of said electrical signal from said particular frequency; second detector means coupled to said tension sensing means for comparing the second control signal therefrom with a predetermined potential to produce a direct current error signal corresponding to differences between said second control signal and said predetermined potential; and circuit means coupling said first and second detector means to said drive motor associated with said second capstan drive means for introducing said direct current and alternating current error signals thereto to cause said second capstan drive means to maintain said particular static tension on said record medium but to impart changes in the dynamic tension thereof to compensate for frequency changes in said first control signal.

3. The control system of claim 2 in which said first detector means includes a reference signal oscillator for producing a reference signal for comparison with said first control signal to produce said alternating current error signal, and which includes a second transducer means coupled to said record member; and circuit means coupling said reference signal oscillator to said second transducer means to cause said second transducer means to record said pilot signal on said record member.

4. A control system for a movable record member having a pilot signal recorded thereon of a predetermined frequency, said system including: first transducer means responsive to the recorded pilot signal on said record member for producing an alternating current first control signal of a particular frequency; first capstan drive means for said record member positioned on one side of said first transducer means for driving said record member past said first transducer means and including an associated drive motor; second capstan drive means for said record member positioned on the other side of said first transducer means for maintaining a particular static tension on said record member and for controlling the dynamic tension on said record member as it is driven past said first transducer means and including an associated drive motor; static tension sensing means positioned to be coupled to said record member for producing a direct current second control signal indicative of the static tension on said record member; a reference signal oscillator for producing a reference signal of a particular frequency; first detector means coupled to said reference signal oscillator and to said first transducer means and responsive to the reference signal from said oscillator and to said first control signal from said first transducer means for producing an alternating current error signal corresponding to changes in the frequency of said first control signal from the frequency of said reference signal; a source of unidirectional potential; differential amplifier means coupled to said source of unidirectional potential and to said static tension sensing means for producing a direct current error signal corresponding to differences between said direct current control signal and the potential of said unidirectional potential source; and circuit means coupling said first detector means and said differential amplifier to said drive motor associated with said second capstan drive means for introducing said direct current and alternating current error signals thereto to cause said second capstan drive means to maintain said particular static tension on said record member and to impart changes in said dynamic tension in directions to compensate for changes in the frequency of said first control signal.

5. The control system of claim 2 in which said first detector means includes a reference signal oscillator for producing a reference signal for comparison with said first control signal to produce said alternating current error signal, and which includes a second transducer means responsive to the pilot signal recorded on said record member for producing a further control signal; further detector means coupled to said reference signal oscillator and to said second transducer means and responsive to said reference signal oscillator and to said further control signal for producing a further error signal; and further circuit means coupling said further detector means to said drive motor associated with said first capstan drive means for introducing said further error signal thereto to control the speed of said record member so as to maintain the speed of the tape past said second transducer means at a constant value.

6. A control system for a movable record member having a pilot signal recorded thereon of a predetermined frequency, said control system including: first transducer means responsive to the recorded pilot signal for producing a first control signal of a particular frequency; second transducer means spaced along the path of the record member from said first transducer means and responsive to the recorded pilot signal on said record member for producing a second control signal of a particular frequency; first drive means for said record member positioned on one side of said first transducer means for driving the record member past said first and second transducer means; second drive means for said record member positioned on the other side of said second transducer means for maintaining a particular static tension on said record member and for controlling the dynamic tension thereon as said record member is driven past said first and second transducer means; first detector means coupled to said first transducer means and responsive to the first control signal therefrom for producing a first error signal corresponding to changes in the frequency of said first control signal from said particular frequency; first circuit means coupling said first detector means to said first drive means for introducing said first error signal to cause said first drive means to cause the same to drive said record member at a constant speed past said first transducer means; second detector means coupled to said second transducer means and responsive to the second control signal therefrom for producing a second error signal corresponding to changes in the frequency of said second control signal from said particular frequency; and second circuit means coupling said second detector means to said second drive means for introducing said second error signal thereto to cause said second drive means to change the dynamic tension on said record member in a direction to compensate for such frequency changes in said second control signal.

7. The combination defined in claim 6 in which said first detector means produces a direct current first error signal for maintaining a particular speed for said record member, and in which said second detector means produces an alternating current second error signal for compensating for elongations and contractions of said record member.

8. A control system for a movable record member having a pilot signal recorded thereon of a predetermined frequency, said control system including: first transducer means responsive to the recorded pilot signal for producing a first control signal; second transducer means spaced along the path of said record member from said first transducer means and responsive to the recorded pilot signal for producing a second control signal; drive means for said record member; and control circuit means coupling said first and second transducer means to said drive means for controlling the speed and the tension of said record member.

9. A control system for a movable record member having a pilot signal recorded thereon of a predetermined frequency, said control system including: first transducer means responsive to the recorded pilot signal for producing a first control signal; second transducer means spaced along the path of said record member from said first transducer means and responsive to the recorded pilot signal for producing a second control signal; first and second drive means for said record member; first control circuit means coupling said first transducer means to said first drive means for controlling the speed of the record member; and second control circuit means coupling said second transducer means to said second drive means for controlling the tension on said record member.

10. A control system for causing an elongated record member to move along a particular path at a predetermined speed, said control system including: first drive means for said record member positioned adjacent said path for driving said record member along said path; second drive means for said record member positioned adjacent said path and spaced along said path from said first drive means for maintaining a particular tension in said elongated record member as it is driven along said path by said first drive means; means coupled to the record member for producing a signal representative of the speed of said record member along said path; a source for producing a reference signal; detector means coupled to said signal producing means and to said source and responsive to the signals therefrom for producing a speed control signal; circuit means coupled to said detector means and to said first drive means and responsive to said speed control signal for maintaining the speed of said record member constant; and further means coupled to said record member for producing a signal indicative of changes in the tension of said record member and coupled to said second drive means to cause said second drive means to compensate for such changes in the tension of said record member.

11. The control system defined in claim 10 in which said further means includes a tension sensor coupled to said record member for producing a signal corresponding to the tension of said record member.

12. The control system defined in claim 10 in which said signal producing means includes a first transducer means positioned adjacent the path of said record member for sensing a signal recorded on said record member to produce a control signal corresponding thereto; and in which said further means includes a second transducer means spaced along the path of said record member from said first transducer means for sensing the signal recorded in said record member to produce a signal representative of changes in the tension of said record member, and in which said further means is coupled to said second drive means to cause said second drive means to change the tension of said record member in a direction to compensate for the aforesaid changes in the tension thereof.

13. A control system for causing an elongated record member to move along a particular path, said control system including: first drive means for said record member positioned adjacent said path for driving said record member along said path; second drive means for said record member positioned adjacent said path and spaced along said path from said first drive means for maintaining a particular tension in said elongated record member as it is driven along said path by said first drive means; means coupled to said record member for producing a signal representative of the speed of said record member along said path; detector means coupled to said signal producing means for producing a speed control signal; circuit means coupled to said detector means and to said first drive means and responsive to said speed control signal for maintaining the speed of said record member constant; and further means coupled to said record member for producing a signal indicative of changes in the tension of said record member and coupled to said second drive means to cause said second drive means to tend to maintain a constant tension in said record member.

References Cited in the file of this patent

UNITED STATES PATENTS

| | | |
|---|---|---|
| 2,963,555 | Brubaker | Dec. 6, 1960 |
| 3,050,954 | Bick et al. | Aug. 21, 1962 |